United States Patent

Shichijyo et al.

[11] Patent Number: 5,449,962
[45] Date of Patent: Sep. 12, 1995

[54] ROTARY ELECTRIC MACHINERY

[75] Inventors: Akiya Shichijyo, Aichi; Shin Kusase, Obu; Hiroaki Kajiura, Nagoya; Atsushi Umeda, Anjo, all of Japan

[73] Assignee: Nippondenso Co., Ltd., Aichi, Japan

[21] Appl. No.: 134,941

[22] Filed: Oct. 13, 1993

[30] Foreign Application Priority Data

Oct. 14, 1992 [JP] Japan ............... 4-276275

[51] Int. Cl.6 .............................. H02K 3/00
[52] U.S. Cl. .................... 310/184; 310/180; 310/198; 318/771; 322/90
[58] Field of Search ........... 310/179, 51, 180, 263, 310/184, 254, 187, 198, 206, 207; 318/771; 322/58, 90

[56] References Cited

U.S. PATENT DOCUMENTS

| | | | |
|---|---|---|---|
| 4,200,817 | 4/1980 | Bratoljic | 310/198 |
| 4,227,107 | 10/1980 | Ban | 310/198 |
| 5,068,587 | 11/1991 | Nakamura et al. | 318/771 |
| 5,122,705 | 6/1992 | Kusase et al. | |
| 5,142,213 | 8/1992 | Stelter | 318/771 |
| 5,274,322 | 12/1993 | Hayashi et al. | 310/198 |
| 5,300,870 | 4/1994 | Smith | 318/771 |

FOREIGN PATENT DOCUMENTS 48140 1/1992 Japan.

Primary Examiner—R. Skudy
Attorney, Agent, or Firm—Cushman Darby & Cushman

[57] ABSTRACT

A stator coil of a rotary electric machine includes a three-phase Y-form connection circuit including first windings Y1, Y2 and Y3, which are connected in Y-form, and a three-phase delta-form connection circuit including second windings Δx3, Δy3 and Δz3 which are connected in delta-form, wherein the second windings Δx3, Δy3 and Δz3 are sequentially inserted in slots of a stator core to have a phase difference of 120° therebetween, and each of the first windings Y1, Y2 and Y3 is divided into two windings, and the divided first windings are separately inserted in the slots, in which the second windings Δx3, Δy3 and Δz3 have been inserted, so that the resultant composite voltage vector of each pair of the divided first windings is shifted by 30° in phase from the voltage vector of one of the second windings Δx3, Δy3 and Δz3. By virtue of the foregoing structure of the rotary electric machinery, the number of slots decreases and an electromagnetic noise is reduced, since a magnetic force due to the air gap magnetomotive force distribution becomes substantially constant independently of a rotational position of a rotor.

6 Claims, 10 Drawing Sheets

ROTARY ELECTRIC MACHINERY

BACKGROUND OF THE INVENTION

1. Field of the Invention

The present invention relates to a rotary electric machine such as a three-phase alternating current generator or a three-phase induction electric motor.

2. Description of Related Art

JP-A-4-8140 discloses a conventional rotary electric machine. In this reference, as shown in FIG. 11, a three-phase Y-form connection circuit 101 including three first windings 100, which are connected in Y-form, is combined with a three-phase delta-form connection circuit 103 including three second windings 102 which are connected in delta-form. The distribution of an air gap magnetomotive force generated on the side of a stator is made uniform with respect to the rotation of pole cores of a rotor to suppress an electromagnetic noise by providing a phase difference of about 30° between voltage vectors 104 and 105 of the first and second windings 100 and 102, respectively as shown in the vector diagram of FIG. 12.

However, in the above-mentioned device, in order to provide the phase difference of about 30° between the first and second windings, it is necessary to double the number of slots in the stator as compared with that of prior art devices, wherein the stator windings are connected only in Y-form or only in delta-form, preceding the above mentioned prior art. In other words, it is necessary to provide a stator core of the above mentioned device with a great many slots. As a result, the winding operation becomes complicated, and the width of each of the core teeth in the stator core is halved and hence, the core teeth may be readily deformed during the winding operation or the stator core assembling operation.

SUMMARY OF THE INVENTION

It is therefore an object of the present invention to provide a rotary electric machine in which electromagnetic noise can be suppressed without causing an increase in the number of slots of a stator core.

In the rotary electric machine of the present invention, the following two technical features have been adopted.

In a first aspect of the present invention, the rotary electric machine has a stator winding comprising a three-phase Y-form connection circuit having three first windings connected in Y-form, and a three-phase delta-form connection circuit having three second windings connected in delta-form and arranged in parallel with the three first windings of the Y-form connection circuit, respectively, wherein the three second windings are inserted in the slots of the stator core of the rotary electric machinery so that respective phase differences between the three second windings are about 120°, and each of the three first windings is divided into two winding portions a respective one each in the divided winding portions of each of the first windings is separately inserted in the slots in which the corresponding second windings have been inserted so that the resultant vector of a pair of divided winding portions is shifted by 30° in phase from the voltage vector of one of the second windings.

In a second aspect of the present invention, the rotary electric machine has a stator winding comprising a three-phase Y-form connection circuit having three first windings connected in Y-form, and a three-phase delta-form connection circuit having three second windings connected in delta-form and arranged in parallel with the three first windings of the Y-form connection circuit, respectively, wherein the three first windings are inserted in the slots of the stator core of the rotary electric machinery so that respective phase differences between the three second windings are about 120°, and each of the three second windings is divided into two winding portions and a respective one of the divided winding portions in each of the second windings is separately inserted in the slots in which the corresponding first windings have been inserted so that the resultant vector of a pair of divided winding portions is shifted by 30° in phase from the voltage vector of one of the first windings.

In the former machine, though a respective one of the divided winding portions of the first windings is inserted in the slots in which the corresponding second windings have been inserted, it is possible to provide a phase difference of about 30° between the resultant voltage vector of the divided winding portions of each of the first windings and the voltage vector of one of the second windings. In other words, the divided winding portions of each of the first windings are inserted in the same slots as the corresponding second windings thereby to generate a changing magnetomotive force which is shifted by 30° in phase from that of the second windings.

In the latter machine, though a respective one of the divided winding portions of the second windings is inserted in the slots in which the corresponding first windings have been inserted, it is possible to provide a phase difference of about 30° between the resultant voltage vector of the divided winding portions of each of the second windings and the voltage vector of one of the first windings. In other words, the divided winding portions of each of the second windings are inserted in the same slots as the corresponding first windings thereby to generate a changing magnetomotive force which is shifted by 30° in phase from that of the first windings.

Thus, by providing a phase difference of about 30° between the first and second windings, an air gap magnetomotive force generated by the stator side is made uniform with respect to the rotation of the pole cores of the rotor. As a result, no large pulsating vibration inducing force is generated between the rotor and the stator.

In both the former and latter rotary electric machinery described above, an electromagnetic noise can be reduced without causing any decrease in the output, since no large pulsating vibration inducing force is generated between the rotor and the stator.

In the former rotary electric machinery, each of the first windings is divided into two winding portions which are separately inserted in the slots of the second windings. Accordingly, the number of slots in the stator core can be made smaller than that of the prior art which suppresses an electromagnetic noise by the combination of the three-phase Y-form connection windings with the three-phase delta-form connection windings.

In the latter rotary electric machinery, each of the second windings is divided into two winding portions which are separately inserted in the slots of the first windings. Accordingly, the number of slots in the stator core can be made smaller than that of the prior art which suppresses an electromagnetic noise by the combination of the three-phase Y-form connection windings with the three-phase delta-form connection windings.

In other words, in both of the former and latter rotary electric machine, it is not necessary to provide slots that are exclusively for use in the Y-form connection circuit and the delta-form connection circuit, respectively, since the windings of the three-phase Y-connection and delta-form connection circuits are inserted in the same slots. Accordingly, the winding operation of the windings in the slots is easy, and the width of each of the core teeth can be made wider, so that deformation of the core teeth, which otherwise occurs during the winding operation and the assembling operation of the stator core, can be prevented.

DESCRIPTION OF THE PREFERRED EMBODIMENTS

The rotary electric machinery of the present invention will be described with reference to the first to third embodiments illustrated in the accompanying drawings.

(First Embodiment)

Figure 1:
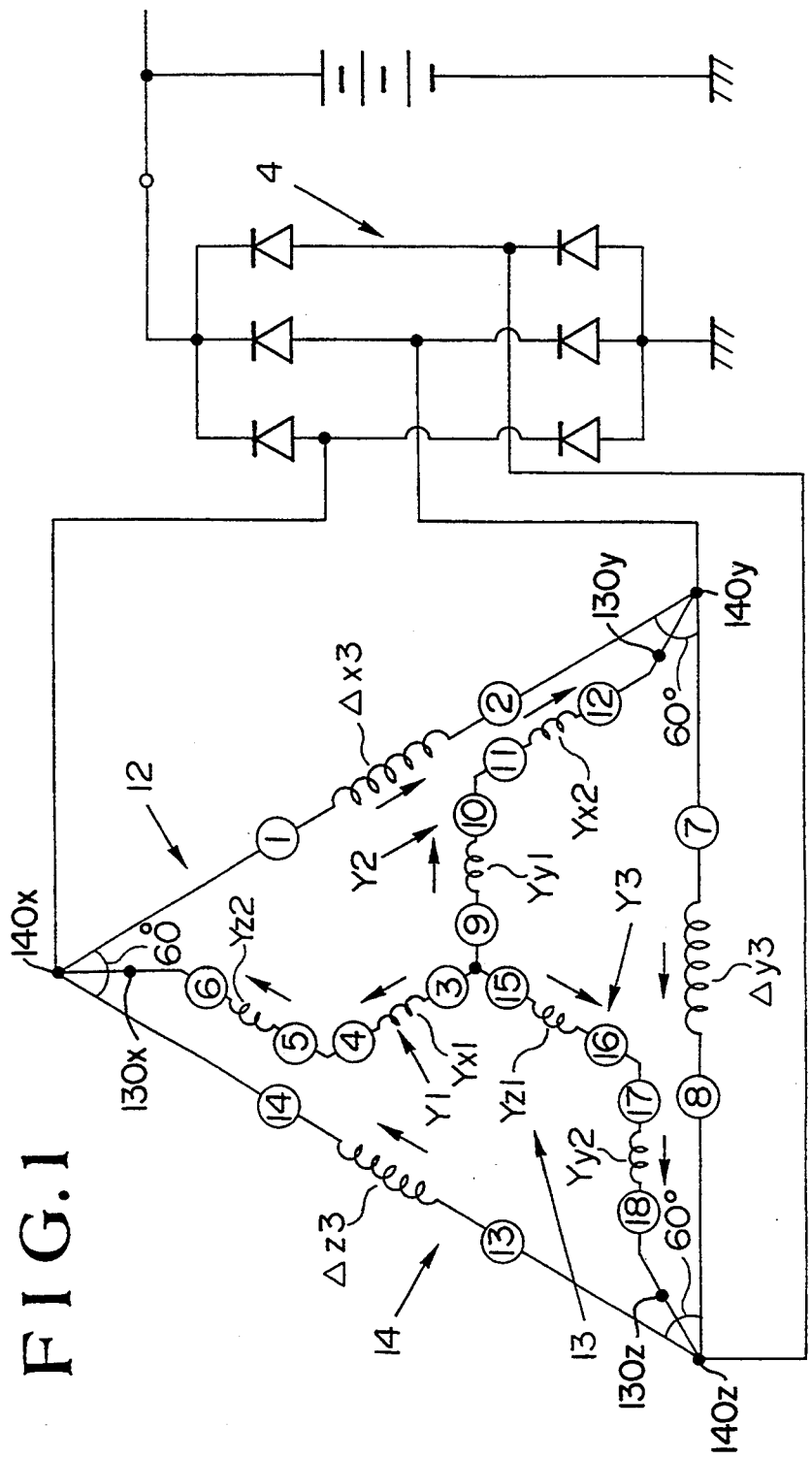
FIG. 1 is a schematic diagram showing the stator windings of the first embodiment according to the first aspect of the present invention.
Figure 2:
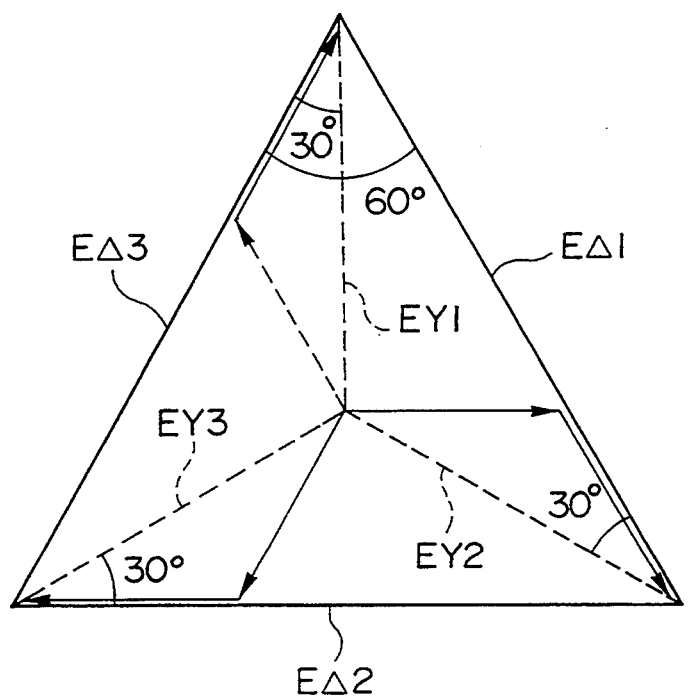
FIG. 2 is a diagram showing the voltage vectors of the stator windings of the first embodiment.
Figure 3:
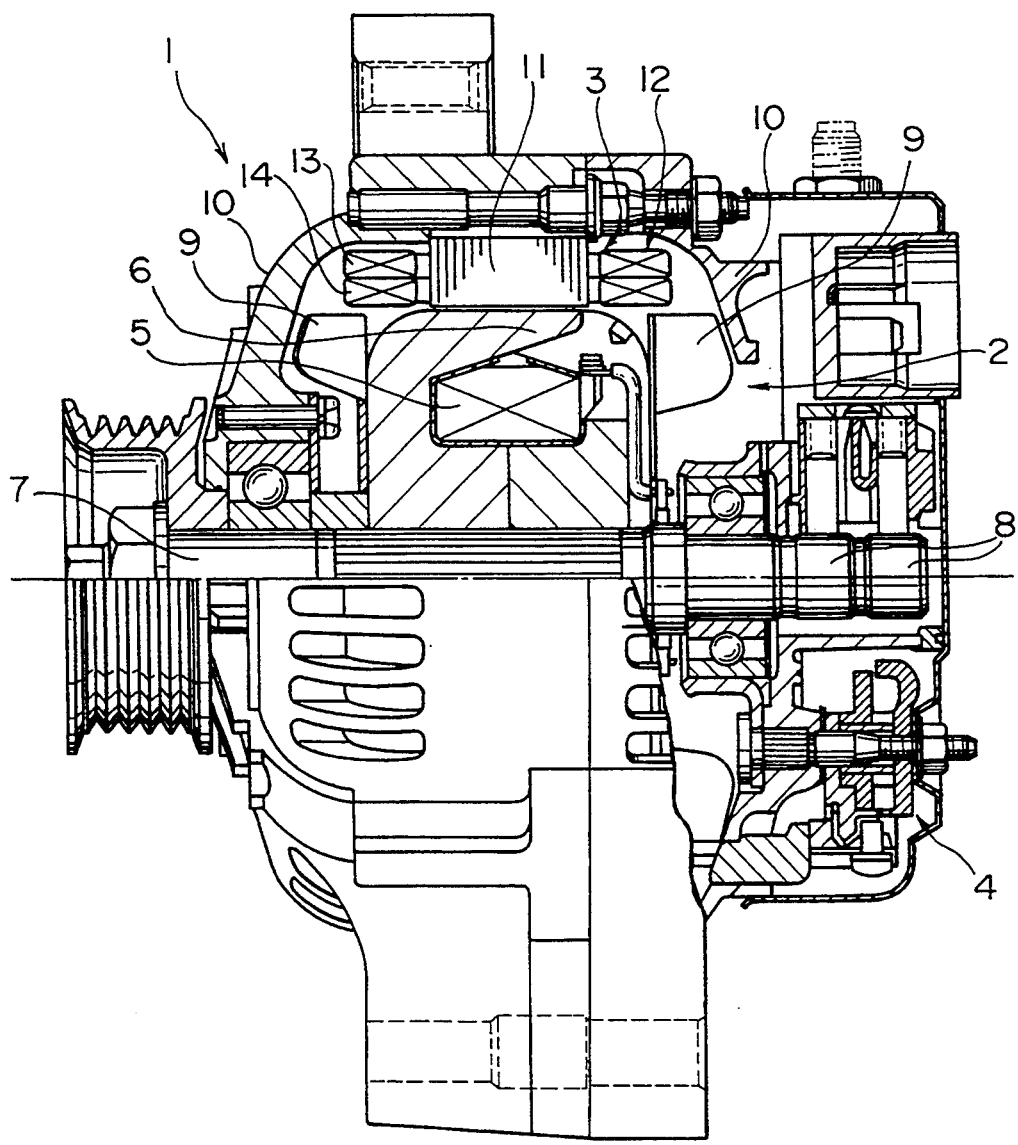
FIG. 3 is a partial sectional view showing a three-phase a.c. generator of the first embodiment.
Figure 4:
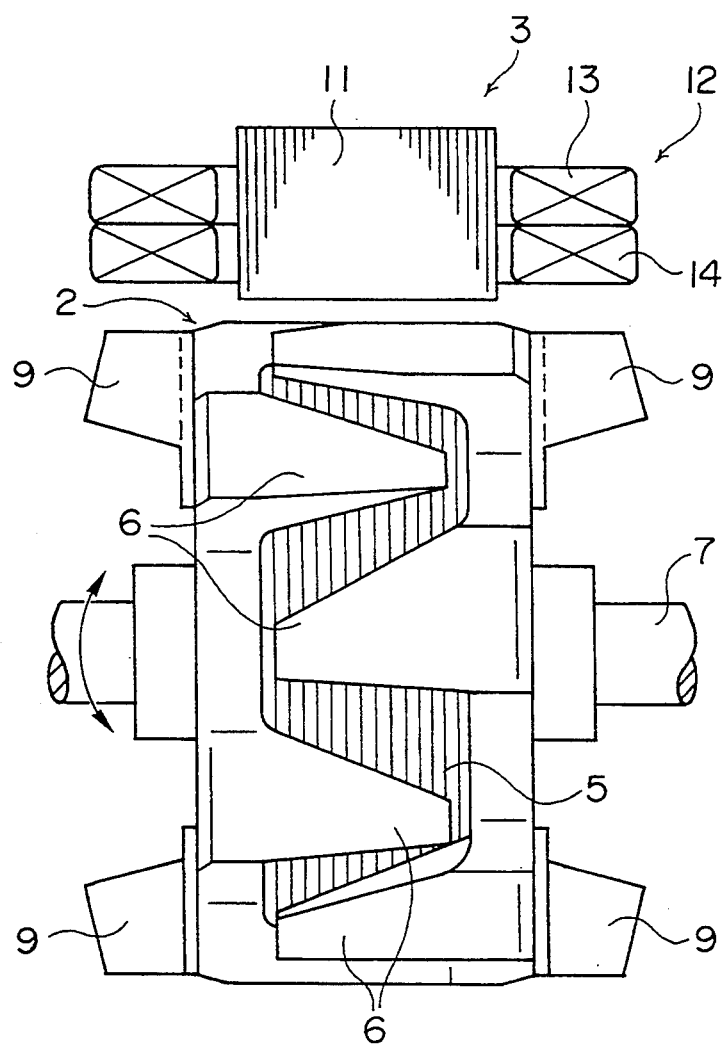
FIG. 4 is a partial sectional view showing pole cores of a rotor of the first embodiment.

FIGS. 1 to 8 show a first embodiment of the first aspect of the present invention. FIG. 1 is a connection diagram showing the stator windings; FIG. 2 is a vector diagram showing the voltage vectors of the stator windings of FIG. 1; FIG. 3 is a partially sectional drawing showing a three-phase a.c. generator; and FIG. 4 is a view showing pole cores of a rotor.

The three-phase a.c. generator 1 comprises a rotor 2 which is driven to rotate by the output power from a vehicle driving engine (not shown), a stator 3 fixed on the outer side of the rotor 2, and a rectifier circuit 4 for rectifying a generated a.c. current, as shown in FIG. 3.

The rotor 2 is a Randel type magnetic field generating rotor having pole cores 6 on which a field winding 5 is mounted, a rotary shaft 7 to which the pole cores 6 are fixed, and slip rings 8 which are fixed to the end of the rotary shaft 7. Cooling fans 9 are fixed to rotary shaft 7 being disposed coaxially with and on both sides of the pole cores 6.

The stator 3 has an annular stator core 11, which is fixedly sandwiched between two end frames 10, and nine independent stator coils 12 wound on the stator core 11. The stator core 11 forms magnetic circuits in cooperation with the pole cores 6. Thirty six slots (not shown), one slot per pole per phase, in which the stator coils 12 are inserted, are provided along the entire inner periphery of the stator core 11.

The stator coils 12 are connected in a three-phase Y-form connection circuit 13 and a three-phase delta-form connection circuit 14. The three-phase Y-form connection circuit 13 comprises three first windings Y1, Y2 and Y3 which are connected with each other in the Y-form. Each of the first windings Y1, Y2 and Y3 is divided into two windings. In other words, the first winding Y1 is divided into two windings Yx1 and Yz2. The first winding Y2 is divided into two windings Yy1 and Yx2. The first winding Y3 is divided into two windings Yz1 and Yy2.

On the other hand, the three-phase delta-form connection circuit 14 comprises three second windings $\Delta x3$, $\Delta y3$ and $\Delta z3$ which are connected with each other in the delta-form three external connection terminals 130X, 130Y, and 130Z of the three-phase Y-form connection circuit 13 are connected with three external connection terminals 140X, 140Y and 140Z of the three-phase delta-form connection circuit 14, respectively, as shown in FIG. 1, so that the three-phase Y-form connection circuit 13 is arranged in parallel with the three-phase delta-form connection circuit 14.

The three second windings $\Delta x3$, $\Delta y3$ and $\Delta z3$ are sequentially inserted in the 36 slots formed in the stator core 11 so that a phase difference of 120° exists between the respective second windings.

On the other hand, the divided windings Yx1 and Yz2 of the first winding Y1 are inserted respectively in the slots in which the second windings $\Delta x3$ and $\Delta z3$ are inserted respectively, so that the resultant vector EY1 representing the voltage across the series connection of the divided windings Yx1 and Yz2 is shifted in phase by 30° from the vectors EA3 and EA1 of the second windings $\Delta z3$ and $\Delta x3$, respectively. Similarly, the divided windings Yy1 and Yx2 of the first winding Y2 are inserted respectively in the slots in which the second windings $\Delta y3$ and $\Delta x3$ are inserted, respectively, so that the resultant vector EY2 representing of the voltage across the series connection of the divided windings Yy1 and Yx2 is shifted in phase by 30° from the vectors EA1 and EA2 of the second windings $\Delta x3$ and $\Delta y3$, respectively. The divided windings Yz1 and Yy2 of the first winding Y3 are inserted respectively in the slots in which the second windings $\Delta z3$ and $\Delta y3$ are inserted respectively, so that the resultant vector EY3 representing the voltage across the series connection of the divided windings Yz1 and Yy2 is shifted in phase by 30° from the vectors EA2 and EA3 of the second windings $\Delta y3$ and $\Delta z3$, respectively.

Figure 5:
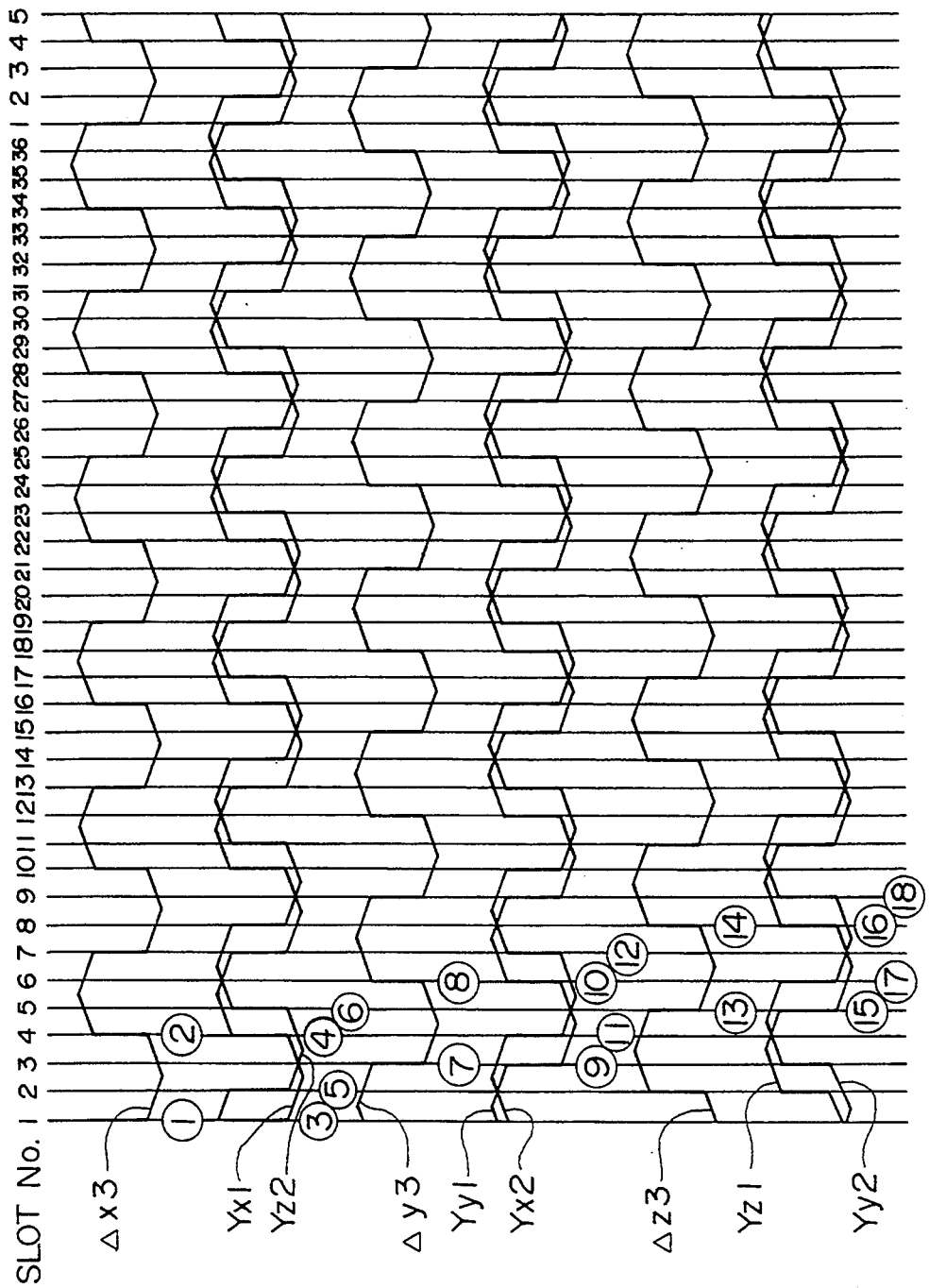
FIG. 5 is a wiring arrangement diagram showing the arrangement of the stator windings of the first embodiment.

The arrangement of the nine windings of the stator coil 12 is shown in FIG. 5. Reference numerals in circles shown in FIG. 5 indicate the relation of correspondence of the windings with the windings shown in the connection diagram of FIG. 1. In the present embodiment, the number of turns of each of the divided windings Yx1, Yy1, Yz1, Yx2, Yy2 and Yz2 is three and the number of turns of each of the second windings $\Delta x3$, Δy3 and Δz3 is ten. Further, in the present embodiment, the three-phase delta-form connection circuit 14 is inserted in the slots of the stator core 11 so that it is positioned at the inner peripheral side with respect to the three-phase Y-form connection circuit 13, as shown in FIG. 4. This provides an enhanced cooling effect for the three-phase delta-form connection circuit 14 with the cooling fans 9.

Further, in the present embodiment, each of the pole cores 6 of the rotor 2 has a shape such that the tip portion of each pole core leans in the rotational direction, as shown in FIG. 4, in order to reduce an electromagnetic noise, in addition to the essential feature of the present invention. In other words, each of the pole cores 6 leans in the rotational direction as shown by a solid line in FIG. 6 as compared with a usual symmetrical trapezoidal shape shown by a dotted line. It is generally known that, when a magnetic flux distortion is caused by an armature reaction upon application of a load, a third higher harmonic component of the distortion causes a circulating current to flow through the delta-form connection circuit. When it is intended to reduce an electromagnetic noise by forming a balanced magnetomotive force of the two sets of three-phase windings, an unbalance of the third higher harmonic component is caused by an armature reaction as shown by a solid line A in FIG. 7, and, as a result, a peak point of a magnetic flux change is shifted in the rotational direction of the pole cores 6 as shown by a solid line B in FIG. 7, which gives rise to a main cause for disturbing the reduction of an electromagnetic noise. Therefore, the shape of the pole cores 6 are made to lean in the rotational direction as mentioned above to suppress generation of the unbalancing third harmonic component, thereby preventing an electromagnetic noise from being caused by an unbalance of the third higher harmonic component.

Even if this approach is adopted, a circulating current would remain during high speed rotation of the rotor 2, because of a dimentional error which has occurred while manufacturing the pole cores 6. Heat generation from the three-phase delta-form connection circuit 14 tends to become larger than that from the three-phase Y-form connection circuit 13 due to a combination of the circulating current with a fundamental current. However, in this embodiment, since the three-phase delta-form connection circuit 14 is provided on the side nearer to the cooling fans 9 having a high cooling effect, an increase of the temperature of the three-phase delta-form connection circuit 14 is avoided to prevent thermal trouble from occurring.

(Operation of the First Embodiment)

The operation of the above mentioned embodiment will be briefly described.

The third higher harmonic current flowing through each of the first windings Y1, Y2 and Y3 is made to be in phase with the third higher harmonic current flowing through each of the second windings Δx3, Δy3 and Δz3 by making the number of turns of each of the divided windings Yx1, Yy1, Yz1, Yx2, Yy2, Yz2 of the first windings Y1, Y2 and Y3 of the three-phase Y-form connection circuit 13 be three and by making the number of each of the second windings Δx3, Δy3 and Δz3 of the three-phase delta-form connection circuit 14 be ten.

Further, since the resultant voltage vector of the first windings Y1, Y2 and Y3 is out of phase by 30° with respect to the resultant voltage vector of the second windings Δx3, Δy3 and Δz3, as shown in FIG. 2 the resultant magnetic forces caused by the field magnetomotive force distribution and the air gap magnetomotive force distribution become substantially constant independently of a position of the rotor 2 in the rotational direction. As a result, no large pulsating vibration inducing force is generated between the rotor 2 and the stator 3.

Figure 8:
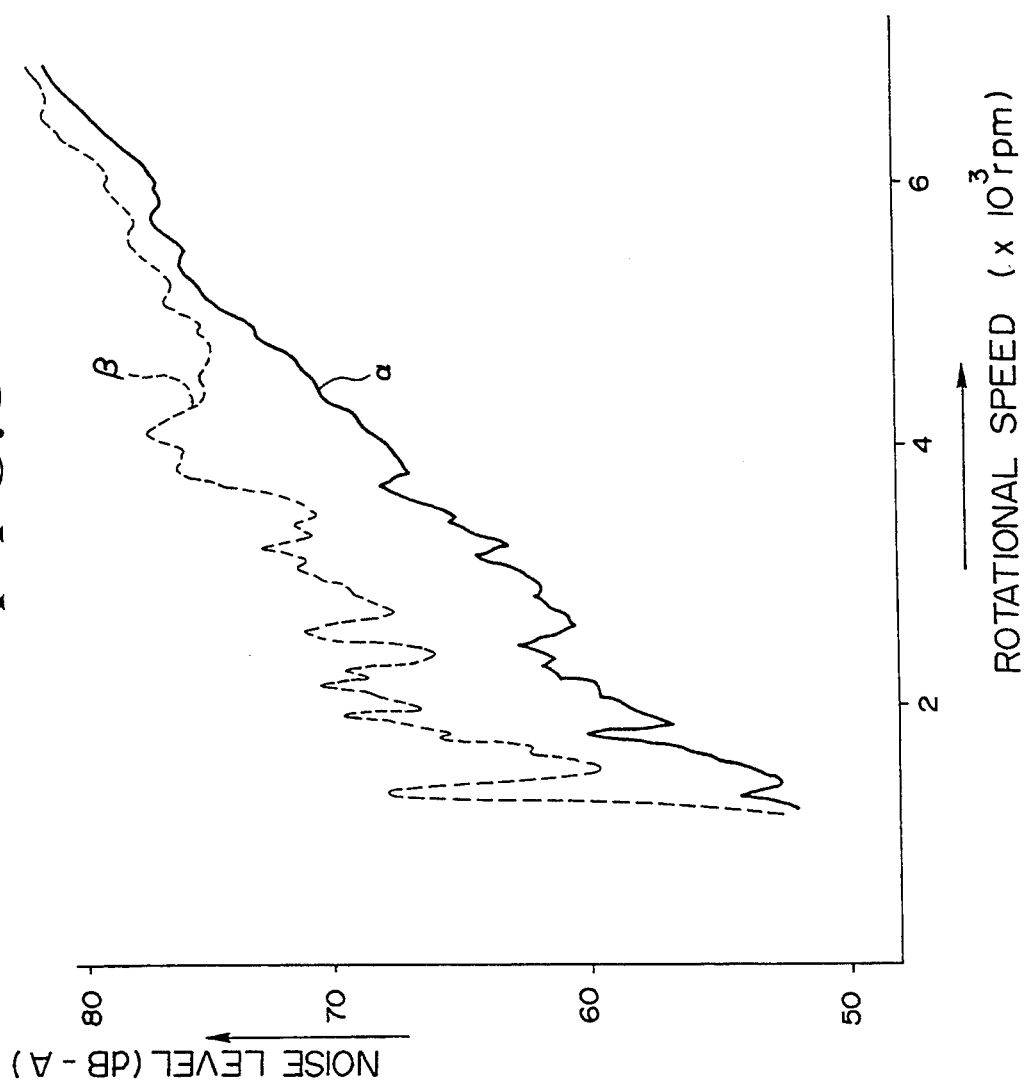
FIG. 8 is a characteristic diagram showing the noise characteristics of the first embodiment.

An experimental result of the first embodiment are shown in FIG. 8. In this experiment, generator according to the principles of the present invention (shown by a solid curve $\alpha$) and a comparative generator (shown by a dotted curve $\beta$) having only a conventional three-phase Y-form connection circuit were made by way of experiment on the basis of a 12 V and 120 A rating three-phase a.c. generators having 36 slots as an example. The experiment was conducted by measuring overall magnetic noises at a position aslant behind the generators by 30 cm when each thereof is generating an equal output under a full load.

(Advantages of the First Embodiment)

According to the first embodiment, a noise generated by the generator can be reduced about y 10 dB, as shown in the graph of FIG. 8 illustrating the result of the experiment.

In addition, the number of slots provided in the stator core 11 may be the same as that used in a conventional three-phase Y-form connection circuit or a prior art three-phase delta-form connection circuit. As a result, the number of slots may be one half that of the prior art machine that is capable of suppressing electromagnetic noise. This makes it easier to carry out a winding operation for putting wires into slots. In addition, the width of each of the slots or core teeth (not shown) can be made large. As a result, deformation of the core teeth can be prevented from occurring during a winding operation or an operation of assembling the stator cores 11. Further, an increase in the magnetic flux density of the core teeth can be avoided.

(Second Embodiment)

Figure 9:
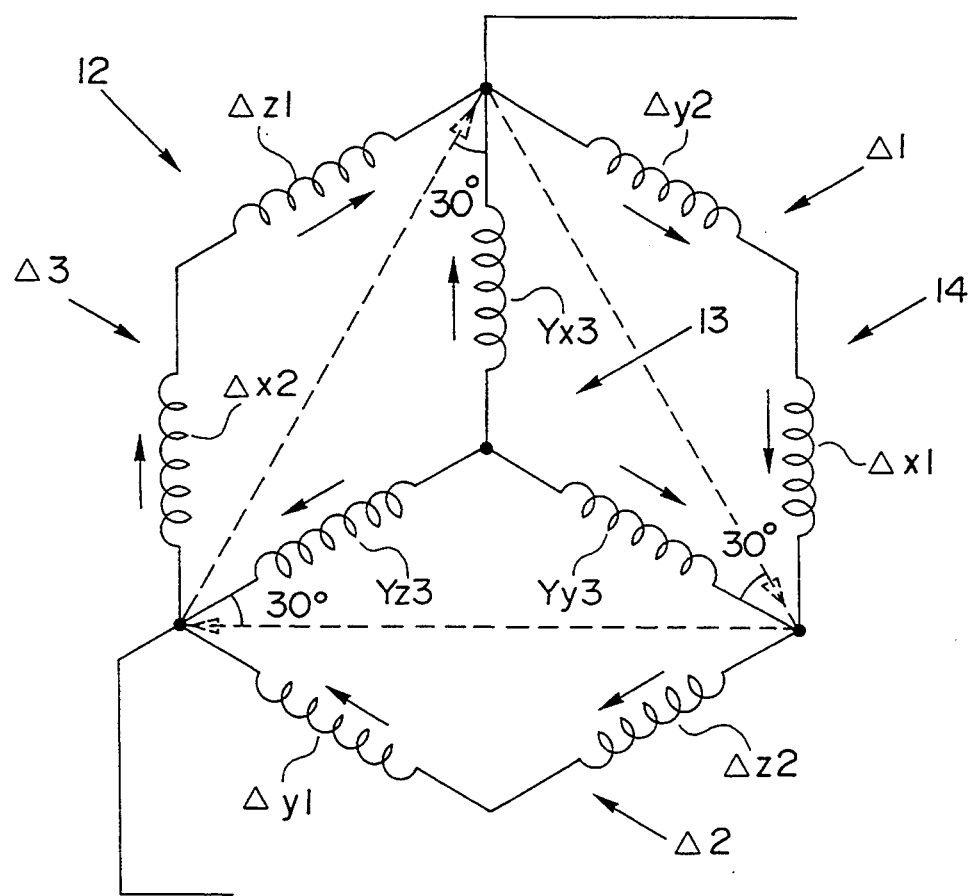
FIG. 9 is a schematic diagram showing the stator windings of the second embodiment according to the second aspect of the present invention.

A second embodiment of the second aspect of the present invention is shown in FIG. 9.

In the first embodiment, each of the first windings is divided into two windings, and the composite voltage vector of the divided two windings is shifted by 30° in phase from the voltage vector of one of the second windings. However, in this second embodiment, each of the first windings Yx3, Yy3 and Yz3 is not divided, but each of the second windings Δ1, Δ2 and Δ3 is divided into two windings. The divided windings are connected in the form of a hexagonal pattern as shown in FIG. 9, and the composite voltage vector of each pair of divided second windings is shifted by 30° in phase from that of one of the first windings Yx3, Yy3 and Yz3.

In other words, the second winding Δ1 is divided into the divided windings Δx1 and Δy2. The second winding Δ2 is divided into the divided winding Δy1 and Δz2. The second winding Δ3 is divided into the divided windings Δz1 and Δx2. Each of the divided windings is separately received in the same slots as those of a corresponding one of the first windings Yx3, Yy3 and Yz3 so that the composite voltage vector of each pair of the divided windings is shifted 30° in phase from the voltage vector of one of the first windings Yx3, Yy3 and Yz3. The first windings Yx3, Yy3 and Yz3 are sequentially inserted in 36 slots provided in the stator core 11 so that a phase difference between two respective first windings Yx3, Yy3 and Yz3 becomes 120°.

In this second embodiment, since all of the nine windings of the stator coil 12 have the same number of turns, each one of the nine winding units can be produced by the same winding machine. Therefore, the winding operation can be remarkably simplified.

(Third Embodiment)

Figure 10:
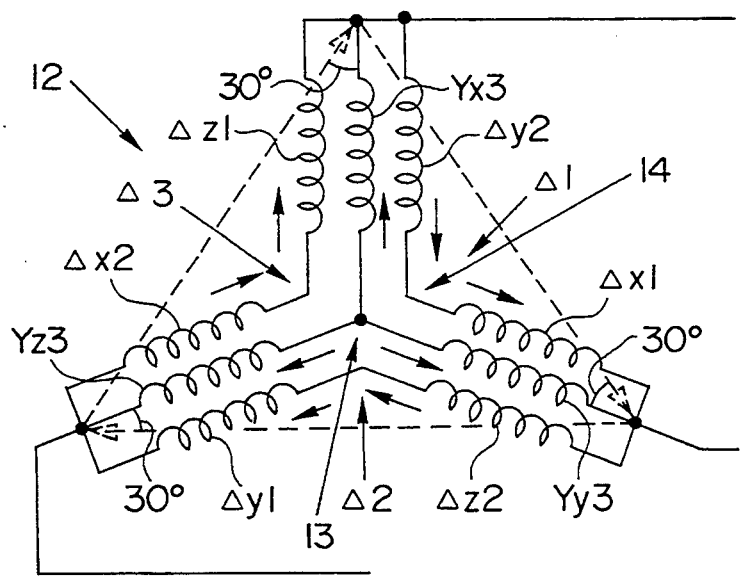
FIG. 10 is a schematic diagram showing the stator windings of the third embodiment according to the second aspect of the present invention.
Figure 11:
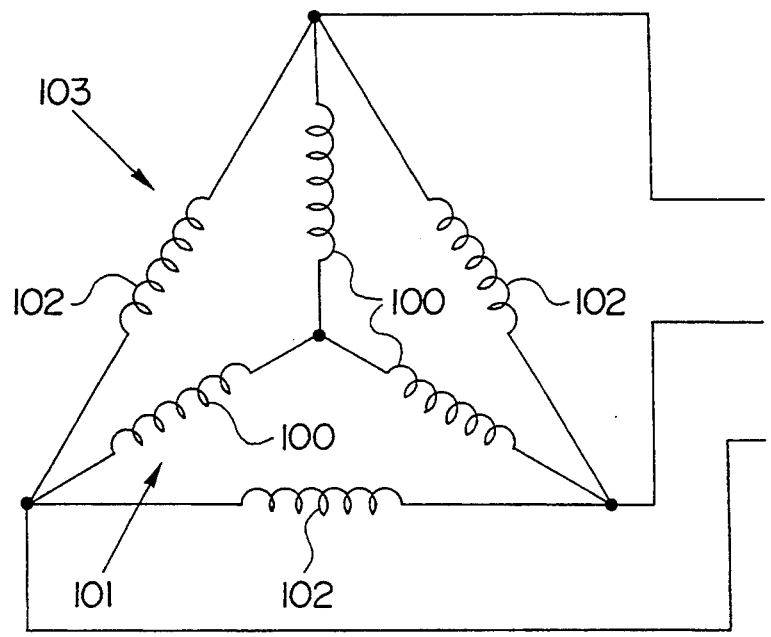
FIG. 11 is a schematic diagram showing the prior art stator windings.
Figure 12:
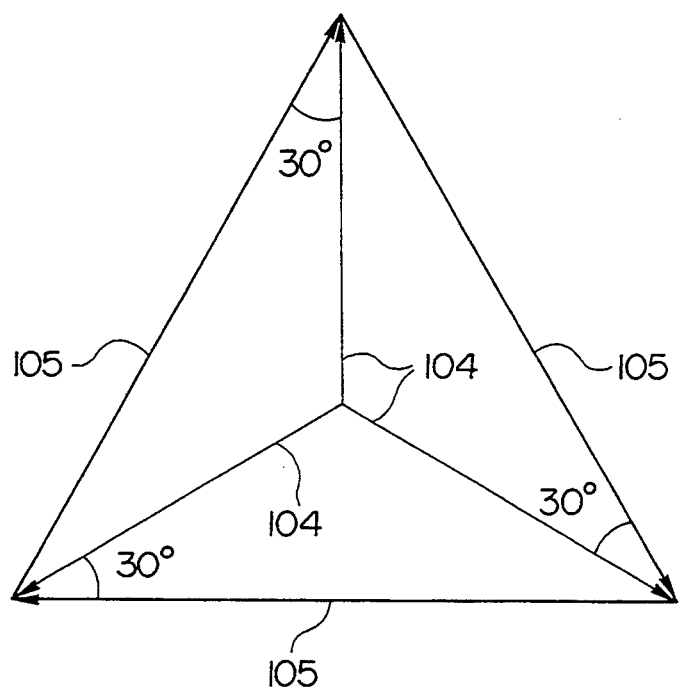
FIG. 12 is a vector diagram showing the voltage vectors of the prior art stator windings.

A third embodiment of the second aspect of the present invention is shown in FIG. 10.

In the above mentioned second embodiment, each of the second windings Δ1, Δ2 and Δ3 is divided into two windings, which are connected with each other to form a hexagonal pattern so that the composite voltage vector of each pair of the divided windings is shifted by 30° from the voltage vector of one of the first windings Yx3, Yy3 and Yz3. In the present embodiment, each of the second windings Δ1, Δ2 and Δ3 is divided into two windings. The divided windings are connected with each other in the form of a star pattern as shown in FIG. 10 so that the composite voltage vector of each pair of the divided windings is shifted by 30° in phase from the voltage vector of one of the first windings Yx3, Yy3 and Yz3.

Since all of the nine winding units of the stator coil 12 in this third embodiment may also have the same number of turns similarly to the second embodiment, all of the nine winding units can be produced by the same winding machine. Therefore, the winding operation can be remarkably simplified.

(Modifications)

In the above mentioned first embodiment, the number of turns of each of the divided windings is made to be three, and the number of turns of each of the second windings is made to be ten. However, if the ratio of the numbers of turns is made to be about 1 : 3, it is possible to suppress magnetic noise.

In other words, the number of turns of the divided windings and that of the second windings may be made to be 2 and 6 or 3 and 9, respectively.

The dividing ratio of the divided windings may be slightly unbalanced, that is, it may deviate from the relation of 1: 1, in order to meet desired electric power output characteristics. In other words, as an example, the first winding may be divided into two windings having 3 and 4 turns, respectively.

Figure 6:
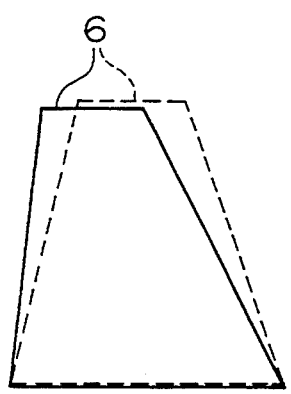
FIG. 6 is a schematic view showing the shape of a pole core of the first embodiment.
Figure 7:
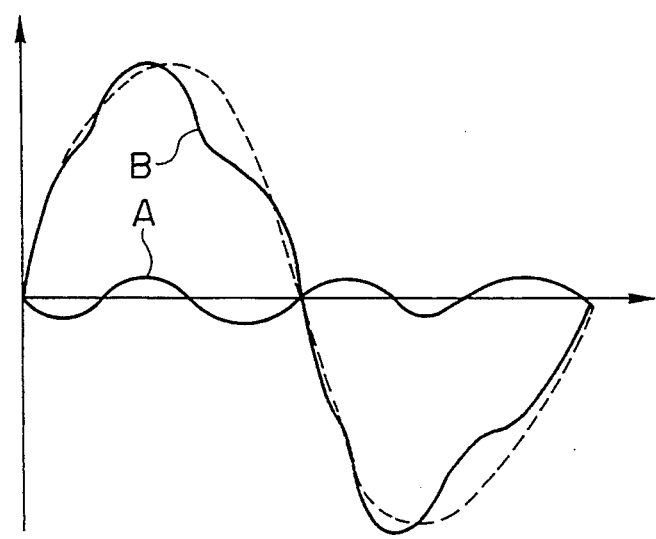
FIG. 7 is a waveform graph showing a change of the magnetic flux of the first embodiment.

Although an example of the shape of the pole cores, which lean in the rotational direction, has been shown in FIG. 6, the pole cores may be symmetrical in shape, if not so much heat generation caused by the circulation of a third higher harmonic current through the delta connection circuit is tolerated.

Although an example has been described in which the three-phase delta-form connection circuit is disposed on the inner side of the three-phase Y-form connection circuit, the former may be disposed on the outer side of the latter by elevating the heat resistivity of the three-phase delta-form connection circuit. In this case, the electromagnetic noise suppression effect is never lost.

Although each of the windings inserted in the slots of the stator core has been described as a wave winding in the foregoing embodiments, it may be a lap winding.

Although, in the foregoing embodiments, each pair of the divided windings of the same phase (Yx1 and Yx2; Yy1 and Yy2; Yz1 and Yz2) is inserted into the slots in the shape of two inverted wave windings, if two uniformly formed coil units are made and simultaneously inserted in the slots in parallel with each other, and the lead connection of each thereof is reversed, it is possible to simplify the winding insertion process.

Although the embodiments of the present invention, which are applicable to a three-phase a.c. electric generator, have been described, it is to be understood that the present invention may be applied to the other rotary electric machinery such as a three-phase induction motor.

We claim:

1. A rotary electric machine comprising:
   a stator core provided with slots; and
   a stator coil provided in said slots, said stator coil comprising:
   a three-phase Y-form connection circuit having three first windings connected in Y-form; and
   a three-phase delta-form connection circuit having three second windings connected in delta-form and arranged in parallel with the three-phase Y-form connection circuits, each of the three second windings being provided in the slots of the stator core so that respective phase differences between the three second windings are about 120°, each of the three first windings being divided into a pair of windings portions, and each winding portion in each pair of winding portions being provided in the slots in which one of the three second windings has been provided so that each of the three first windings defined by the pair of winding portions has a resultant composite voltage vector that is shifted by 30° in phase from a voltage vector of one of the second windings that is adjacent the resultant composite voltage vector of the first winding.

2. A rotary electric machine as defined in claim 1, wherein a ratio of a number of turns of a first winding portion of each of the three first windings to a number of turns of each of the three second windings is about 1:3.

3. A rotary electric machine comprising:
   a stator core provided with slots; and
   a stator coil provided in the slots, the stator coil comprising:
   a three-phase Y-form connection circuit having three first windings connected in Y-form, and
   a three-phase delta-form connection circuit having three second windings connected in delta-form, the three-phase Y-form connection circuit and the three-phase delta-form connection circuit each having three external connection terminals, wherein corresponding external connection terminals are connected with each other so that the three-phase Y-form connection circuit and the three-phase delta-form connection circuit are connected in parallel with each other,
   wherein each winding in at least one of the three first windings and the three second windings is divided into a pair of windings portions, and
   wherein each of the three first windings and each of the three second windings are provided in the slots of the stator core so that a resultant composite phase voltage vector of each of the three first windings is shifted by 30° in phase from a resultant composite phase voltage vector of an adjacent one of the three second windings.

4. A rotary electric machine as defined in claim 3, wherein each of the three first windings and each of the three second windings are divided into a pair of windings portions.

5. Rotary electric machinery as defined in claim 3, in which each of the second windings is divided into two windings, the divided second windings being connected in the form of a hexagonal pattern.

6. Rotary electric machinery as defined in claim 3, in which each of the second windings is divided into two windings, the divided second windings being connected in the form of a star pattern.

* * * * *